(12) United States Patent
DiGiovanni et al.

(10) Patent No.: US 8,919,462 B2
(45) Date of Patent: *Dec. 30, 2014

(54) CUTTING ELEMENTS FOR EARTH-BORING TOOLS, EARTH-BORING TOOLS INCLUDING SUCH CUTTING ELEMENTS AND RELATED METHODS

(71) Applicant: Baker Hughes Incorporated, Houston, TX (US)

(72) Inventors: Anthony A. DiGiovanni, Houston, TX (US); Nicholas J. Lyons, Sugar Land, TX (US); Matthew S. Hale, Houston, TX (US); John H. Liversage, Springs (ZA)

(73) Assignees: Baker Hughes Incorporated, Houston, TX (US); Element Six Ltd, County Clare (IE)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,909

(22) Filed: Oct. 25, 2013

(65) Prior Publication Data

US 2014/0048339 A1 Feb. 20, 2014

Related U.S. Application Data

(63) Continuation of application No. 13/092,396, filed on Apr. 22, 2011, now Pat. No. 8,684,112.

(60) Provisional application No. 61/327,484, filed on Apr. 23, 2010.

(51) Int. Cl.
| | |
|---|---|
| *E21B 10/56* | (2006.01) |
| *B24D 99/00* | (2010.01) |
| *E21B 10/55* | (2006.01) |
| *B24D 18/00* | (2006.01) |
| *E21B 10/573* | (2006.01) |
| *E21B 10/567* | (2006.01) |

(52) U.S. Cl.
CPC .......... *E21B 10/5673* (2013.01); *B24D 99/005* (2013.01); *E21B 10/55* (2013.01); *B24D 18/00* (2013.01); *E21B 10/5735* (2013.01)

USPC ............................................ 175/430; 51/307

(58) Field of Classification Search
USPC ...................... 175/430, 431, 432, 434; 51/307
See application file for complete search history.

(56) References Cited

U.S. PATENT DOCUMENTS

| | | |
|---|---|---|
| 4,224,380 A | 9/1980 | Bovenkerk et al. |
| 4,538,690 A | 9/1985 | Short, Jr. |

(Continued)

FOREIGN PATENT DOCUMENTS

| | | |
|---|---|---|
| EP | 546725 A1 | 9/1996 |
| EP | 835981 A2 | 4/1998 |

(Continued)

OTHER PUBLICATIONS

Bilen et al., U.S. Appl. No. 13/461,388 entitled Earth-Boring Tools Having Cutting Elements with Cutting Faces Exhibiting Multiple Coefficients of Friction, and Related Methods, filed May 1, 2012.

(Continued)

*Primary Examiner* — William P Neuder
(74) *Attorney, Agent, or Firm* — TraskBritt

(57) ABSTRACT

Cutting elements, earth-boring drill bits having such cutting elements and related methods are described herein. In some embodiments, a cutting element for an earth-boring tool may include a diamond table having an indentation in a cutting face thereof and a shaped feature in a substrate at the interface between the diamond table and the substrate, the shaped feature corresponding to the indentation in the cutting face of the diamond table. In further embodiments, a cutting element for an earth-boring tool may include a sacrificial structure positioned within an indentation in a diamond table. In additional embodiments, a method of forming a cutting element may include positioning a sacrificial structure in a mold, positioning a powdered precursor material over the sacrificial structure, and pressing and sintering the powdered precursor material to form a diamond table having an indentation in a cutting face formed by the sacrificial structure.

17 Claims, 5 Drawing Sheets

(56) References Cited

U.S. PATENT DOCUMENTS

| | | | |
|---|---|---|---|
| 4,539,018 A | 9/1985 | Whanger et al. | |
| 4,558,753 A | 12/1985 | Barr | |
| 4,593,777 A | 6/1986 | Barr | |
| 4,629,373 A | 12/1986 | Hall | |
| 4,858,707 A | 8/1989 | Jones et al. | |
| 4,872,520 A | 10/1989 | Nelson | |
| 4,984,642 A | 1/1991 | Renard et al. | |
| 4,997,049 A | 3/1991 | Tank et al. | |
| 5,007,207 A | 4/1991 | Phaal | |
| 5,054,246 A | 10/1991 | Phaal et al. | |
| 5,078,219 A | 1/1992 | Morrell et al. | |
| 5,127,923 A | 7/1992 | Bunting et al. | |
| 5,333,699 A | 8/1994 | Thigpen | |
| 5,355,969 A | 10/1994 | Hardy et al. | |
| 5,377,773 A | 1/1995 | Tibbitts | |
| 5,447,208 A | 9/1995 | Lund et al. | |
| 5,449,048 A | 9/1995 | Thigpen et al. | |
| 5,533,582 A | 7/1996 | Tibbitts | |
| 5,549,171 A | 8/1996 | Mensa et al. | |
| 5,569,000 A | 10/1996 | Littecke et al. | |
| 5,607,024 A | 3/1997 | Keith | |
| 5,653,300 A | 8/1997 | Lund et al. | |
| 5,984,005 A | 11/1999 | Hart et al. | |
| 6,045,440 A | 4/2000 | Johnson et al. | |
| 6,059,054 A | 5/2000 | Portwood et al. | |
| 6,065,554 A * | 5/2000 | Taylor et al. | 175/430 |
| 6,068,071 A | 5/2000 | Jurewicz | |
| 6,145,608 A | 11/2000 | Lund et al. | |
| 6,164,394 A | 12/2000 | Mensa-Wilmot et al. | |
| 6,196,910 B1 | 3/2001 | Johnson et al. | |
| 6,202,771 B1 | 3/2001 | Scott et al. | |
| 6,328,117 B1 | 12/2001 | Berzas et al. | |
| 6,524,363 B2 * | 2/2003 | Gates et al. | 75/231 |
| 6,527,065 B1 | 3/2003 | Tibbitts et al. | |
| 6,550,556 B2 | 4/2003 | Middlemiss et al. | |
| 7,000,715 B2 | 2/2006 | Sinor et al. | |
| 7,363,992 B2 | 4/2008 | Stowe et al. | |
| 7,373,998 B2 | 5/2008 | Cariveau et al. | |
| 7,533,740 B2 | 5/2009 | Zhang et al. | |
| 7,740,090 B2 | 6/2010 | Shen et al. | |
| 8,016,054 B2 | 9/2011 | Lancaster et al. | |
| 8,191,656 B2 | 6/2012 | Dourfaye et al. | |
| 8,210,288 B2 | 7/2012 | Chen et al. | |
| D712,941 S | 9/2014 | Mo | |
| 2004/0009376 A1 | 1/2004 | Wan et al. | |
| 2005/0247492 A1 | 11/2005 | Shen et al. | |
| 2005/0269139 A1 | 12/2005 | Shen et al. | |
| 2007/0235230 A1 | 10/2007 | Cuillier et al. | |
| 2008/0006448 A1 | 1/2008 | Zhang et al. | |
| 2008/0264696 A1 | 10/2008 | Dourfaye et al. | |
| 2008/0308321 A1 | 12/2008 | Aliko | |
| 2009/0114628 A1 | 5/2009 | DiGiovanni | |
| 2010/0084198 A1 | 4/2010 | Durairajan et al. | |
| 2010/0276200 A1 | 11/2010 | Schwefe et al. | |
| 2011/0031030 A1 | 2/2011 | Shen et al. | |
| 2011/0171414 A1 | 7/2011 | Sreshta et al. | |
| 2011/0259642 A1 | 10/2011 | DiGiovanni et al. | |
| 2012/0205162 A1 | 8/2012 | Patel et al. | |
| 2013/0068534 A1 | 3/2013 | DiGiovanni et al. | |
| 2013/0068537 A1 | 3/2013 | DiGiovanni | |
| 2013/0068538 A1 | 3/2013 | DiGiovanni et al. | |

FOREIGN PATENT DOCUMENTS

| | | |
|---|---|---|
| EP | 979699 A1 | 2/2000 |
| WO | 9415058 A1 | 7/1994 |
| WO | 9427769 A1 | 12/1994 |
| WO | 0048789 A1 | 8/2000 |
| WO | 0160554 A1 | 8/2001 |
| WO | 2008006010 A3 | 5/2008 |

OTHER PUBLICATIONS

GUILIN Color Engineered Diamond Technology (EDT) Co. Ltd., Brochure, Offshore Technology Conference Apr. 30-May 3, 2012.
GUILIN Star Diamond Superhard Material Co. Ltd., Brochure, Offshore Technology Conference Apr. 30-May 3, 2012.
International Search Report for International Application No. PCT/US2011/033559 mailed Oct. 25, 2011, 3 pages.
International Written Opinion for International Application No. PCT/US2011/033559 mailed Oct. 25, 2011, 4 pages.
Pilkey in Peterson's Stress Concentration Factors (2d ed., Wiley Interscience 1997), in Section 2.6.6, on p. 71 (1997).
Patel et al., U.S. Appl. No. 13/840,195 entitled Cutting Elements for Earth-Boring Tools, Earth-Boring Tools Including Such Cutting Elements, and Related Methods, filed Mar. 15, 2013.
International Preliminary Report on Patentability for International Application No. PCT/US2011/033559 dated Oct. 23, 2012, 5 pages.

* cited by examiner

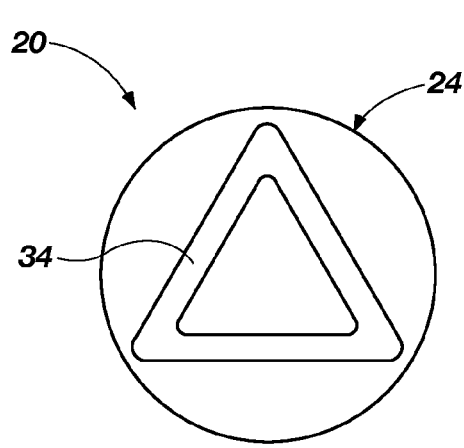
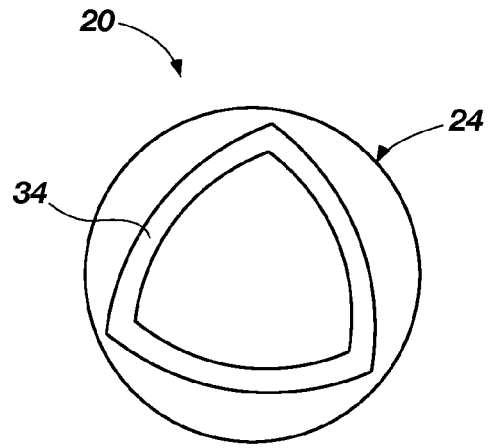
FIG. 4  FIG. 5
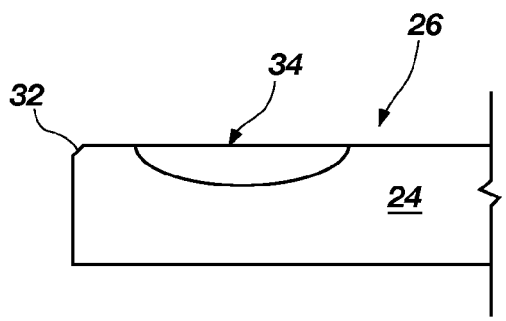
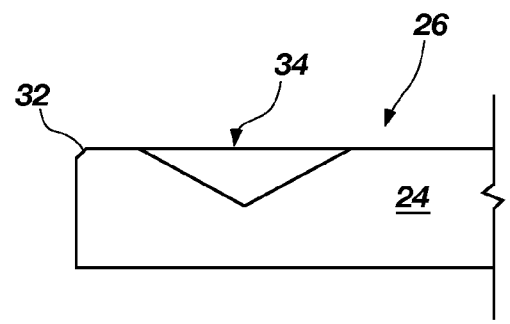
FIG. 6  FIG. 7
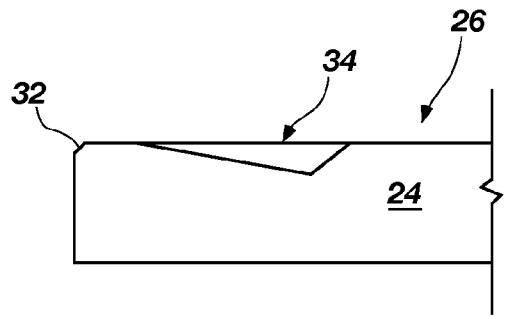
FIG. 8

CUTTING ELEMENTS FOR EARTH-BORING TOOLS, EARTH-BORING TOOLS INCLUDING SUCH CUTTING ELEMENTS AND RELATED METHODS

CROSS-REFERENCE TO RELATED APPLICATION

This application is a continuation of U.S. patent application Ser. No. 13/092,396, filed Apr. 22, 2011, now U.S. Pat. No. 8,684,112, issued Apr. 1, 2014, which application claims the benefit of the filing date of U.S. Provisional Patent Application No. 61/327,484, filed Apr. 23, 2010, for "CUTTING ELEMENTS FOR EARTH-BORING TOOLS, EARTH-BORING TOOLS INCLUDING SUCH CUTTING ELEMENTS AND RELATED METHODS," the disclosure of each of which is incorporated herein in its entirety by this reference.

TECHNICAL FIELD

Embodiments of the present invention relate to earth-boring tools, cutting elements for such earth-boring tools, and related methods.

BACKGROUND

Wellbores are formed in subterranean formations for various purposes including, for example, extraction of oil and gas from the subterranean formation and extraction of geothermal heat from the subterranean formation. Wellbores may be formed in a subterranean formation using a drill bit such as, for example, an earth-boring rotary drill bit. Different types of earth-boring rotary drill bits are known in the art including, for example, fixed-cutter bits (which are often referred to in the art as "drag" bits), rolling-cutter bits (which are often referred to in the art as "rock" bits), diamond-impregnated bits, and hybrid bits (which may include, for example, both fixed cutters and rolling cutters). The drill bit is rotated and advanced into the subterranean formation. As the drill bit rotates, the cutters or abrasive structures thereof cut, crush, shear, and/or abrade away the formation material to form the wellbore. A diameter of the wellbore drilled by the drill bit may be defined by the cutting structures disposed at the largest outer diameter of the drill bit.

The drill bit is coupled, either directly or indirectly, to an end of what is referred to in the art as a "drill string," which comprises a series of elongated tubular segments connected end-to-end that extends into the wellbore from the surface of the formation. Often various tools and components, including the drill bit, may be coupled together at the distal end of the drill string at the bottom of the wellbore being drilled. This assembly of tools and components is referred to in the art as a "bottom-hole assembly" (BHA).

The drill bit may be rotated within the wellbore by rotating the drill string from the surface of the formation, or the drill bit may be rotated by coupling the drill bit to a downhole motor, which is also coupled to the drill string and disposed proximate the bottom of the wellbore. The downhole motor may comprise, for example, a hydraulic Moineau-type motor having a shaft, to which the drill bit is mounted, that may be caused to rotate by pumping fluid (e.g., drilling mud or fluid) from the surface of the formation down through the center of the drill string, through the hydraulic motor, out from nozzles in the drill bit, and back up to the surface of the formation through the annular space between the outer surface of the drill string and the exposed surface of the formation within the wellbore.

BRIEF SUMMARY

In some embodiments, a cutting element for an earth-boring tool may include a diamond table positioned on a substrate, the diamond table having an indentation in a cutting face thereof Additionally, the cutting element may include a shaped feature in the substrate at an interface between the diamond table and the substrate corresponding to the indentation in the cutting face of the diamond table.

In further embodiments, a cutting element for an earth-boring tool may include a diamond table positioned on a substrate, an indentation in a cutting face of the diamond table, and a sacrificial structure positioned within the indentation.

In additional embodiments, a method of forming a cutting element may include positioning a sacrificial structure in a mold and positioning a powdered precursor material over the sacrificial structure. The method may further include pressing and sintering the powdered precursor material to form a diamond table having an indentation in a cutting face formed by the sacrificial structure.

In yet further embodiments, an earth-boring tool may include at least one cutting element including a diamond table positioned on a substrate, an indentation in a cutting face of the diamond table, and a shaped feature in the substrate at an interface between the diamond table and the substrate corresponding to the indentation in the cutting face of the diamond table.

In additional embodiments, an earth-boring tool may comprise at least one cutting element and a depth-of-cut limiting feature. The at least one cutting element may comprise a diamond table positioned on a substrate and an indentation in a cutting face of the diamond table. The depth-of-cut limiting feature may be positioned on the earth-boring tool to facilitate interaction between uncut earth formation and the indentation in the cutting face of the diamond table during earth-boring operations.

In yet additional embodiments, a method of faulting a cutting element may include positioning a powder preform adjacent a shaped mold, and pressing and sintering the powder preform to form a diamond table having an indentation in a cutting face formed by the shaped mold.

BRIEF DESCRIPTION OF THE DRAWINGS

While the specification concludes with claims particularly pointing out and distinctly claiming what are regarded as embodiments of the present invention, various features and advantages of this invention may be more readily ascertained from the following description of example embodiments of the invention provided with reference to the accompanying drawings.

FIG. 4 is a top view of a cutting element showing a cutting face having an indentation extending along a path configured as a polygon, according to an embodiment of the present invention.

FIG. 5 is a top view of a cutting element showing a cutting face having an indentation extending along a path configured as a Reuleaux polygon, according to an embodiment of the present invention.

FIG. 6 is a cross-sectional view of a portion of a diamond table of a cutting element having an indentation with a cross-sectional shape generally defined as an elliptical arc, according to an embodiment of the present invention.

FIG. 7 is a cross-sectional view of a portion of a diamond table of a cutting element having an indentation with a cross-sectional shape generally defined as a symmetric V-shape, according to an embodiment of the present invention.

FIG. 8 is a cross-sectional view of a portion of a diamond table of a cutting element having an indentation with a cross-sectional shape generally defined as an asymmetric V-shape, according to an embodiment of the present invention.

DETAILED DESCRIPTION OF THE INVENTION

The illustrations presented herein are not actual views of any particular earth-boring tool, drill bit, or component of such a tool or bit, but are merely idealized representations which are employed to describe embodiments of the present invention.

As used herein, the term earth-boring tool means and includes any tool used to remove formation material and form a bore (e.g., a wellbore) through the formation by way of the removal of the formation material. Earth-boring tools include, for example, rotary drill bits (e.g., fixed-cutter or "drag" bits and roller cone or "rock" bits), hybrid bits including both fixed cutters and roller elements, coring bits, percussion bits, bi-center bits, reamers (including expandable reamers and fixed-wing reamers), and other so-called "hole-opening" tools.

As used herein, the term "cutting element" means and includes any element of an earth-boring tool that is used to cut or otherwise disintegrate formation material when the earth-boring tool is used to form or enlarge a bore in the formation.

Figure 1:
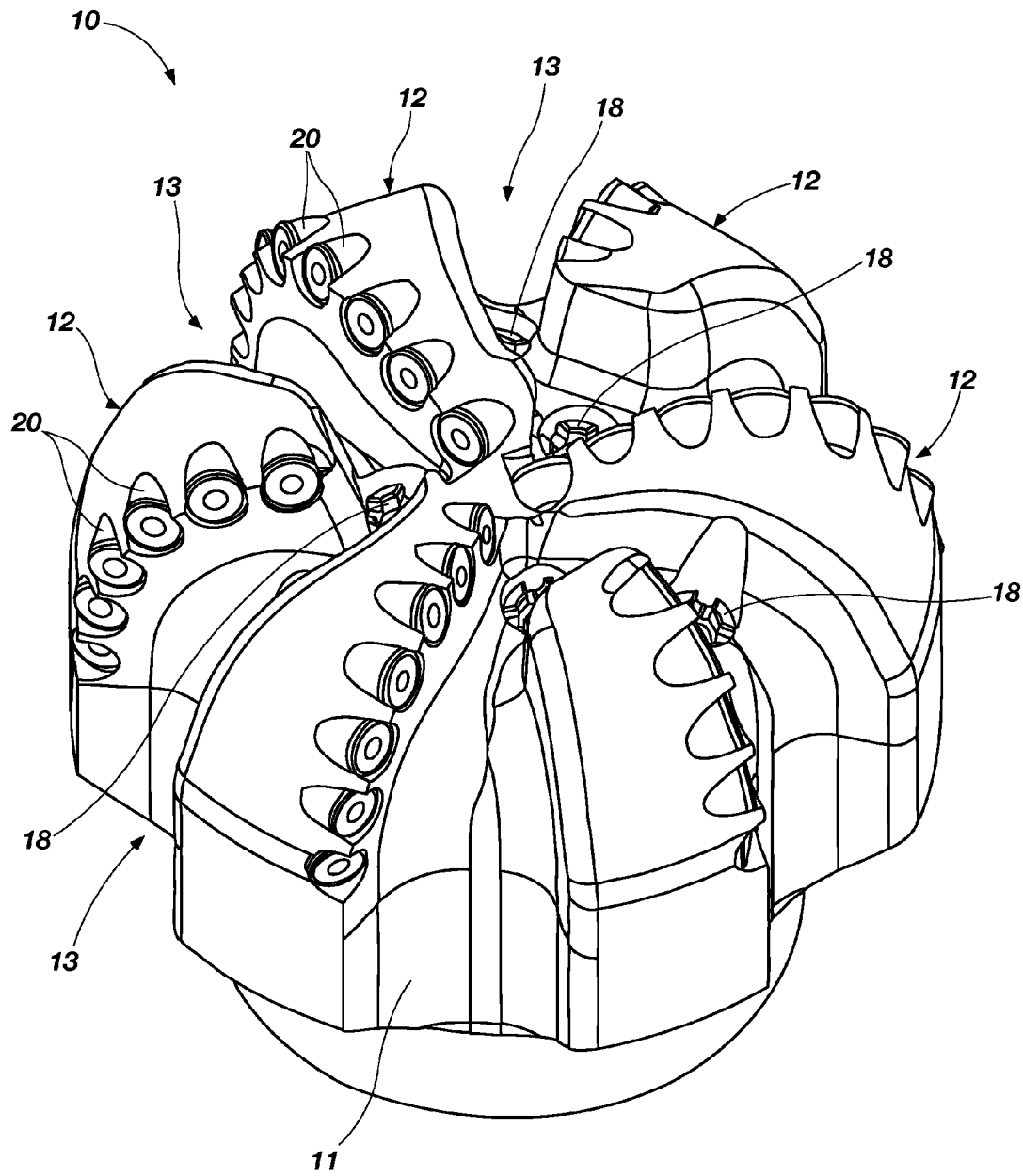
FIG. 1 is a perspective view of an earth-boring drill bit including cutting elements, according to an embodiment of the present invention.

FIG. 1 illustrates an embodiment of an earth-boring tool of the present invention. The earth-boring tool of FIG. 1 is a fixed-cutter rotary drill bit 10 having a bit body 11 that includes a plurality of blades 12 that project outwardly from the bit body 11 and are separated from one another by fluid courses 13. The portions of the fluid courses 13 that extend along the radial sides (the "gage" areas of the drill bit 10) are often referred to in the art as "junk slots." The bit body 11 further includes a generally cylindrical internal fluid plenum, and fluid passageways that extend through the bit body 11 to the exterior surface of the bit body 11. Nozzles 18 may be secured within the fluid passageways proximate the exterior surface of the bit body 11 for controlling the hydraulics of the drill bit 10 during drilling. A plurality of cutting elements 20 is mounted to each of the blades 12.

During a drilling operation, the drill bit 10 may be coupled to a drill string (not shown). As the drill bit 10 is rotated within the wellbore, drilling fluid may be pumped down the drill string, through the internal fluid plenum and fluid passageways within the bit body 11 of the drill bit 10, and out from the drill bit 10 through the nozzles 18. Formation cuttings generated by the cutting elements 20 of the drill bit 10 may be carried with the drilling fluid through the fluid courses 13, around the drill bit 10, and back up the wellbore through the annular space within the wellbore outside the drill string.

Figure 2:
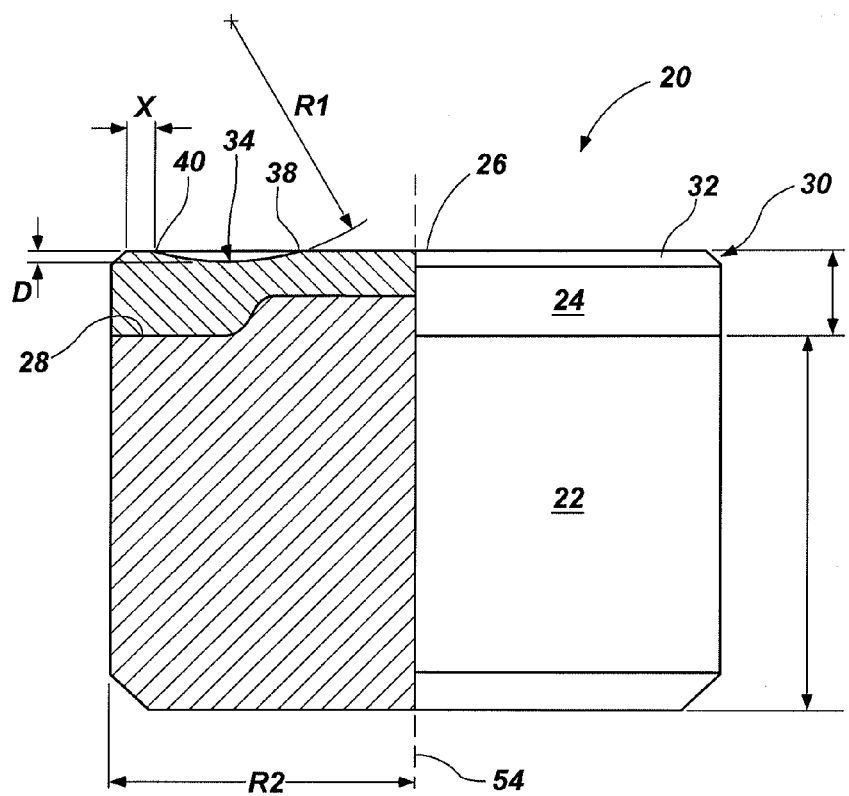
FIG. 2 is a partially cut-away side view of a cutting element having an indentation in a cutting face according to an embodiment of the present invention.

FIG. 2 is a side view of a partially cut-away cutting element 20 of the drill bit 10 of FIG. 1. The cutting element 20 includes a cutting element substrate 22 having a diamond table 24 thereon. The diamond table 24 may comprise a polycrystalline diamond (PCD) material, having a cutting face 26 defined thereon. Additionally, an interface 28 may be defined between the cutting element substrate 22 and diamond table 24. Optionally, the diamond table 24 may have a chamfered edge 30. The chamfered edge 30 of the diamond table 24 shown in FIG. 2 has a single chamfer surface 32, although the chamfered edge 30 also may have additional chamfer surfaces, and such additional chamfer surfaces may be oriented at chamfer angles that differ from the chamfer angle of the chamfer surface 32, as known in the art. The cutting element substrate 22 may have a generally cylindrical shape, as shown in FIG. 2. One or more arcuate, or "radiused" edges or edge portions may be employed in lieu of or in addition to, one or more chamfered surfaces at a peripheral edge of the diamond table, as known to those of ordinary skill in the art.

The diamond table 24 may be framed on the cutting element substrate 22, or the diamond table 24 and the cutting element substrate 22 may be separately formed and subsequently attached together. The cutting element substrate 22 may be formed from a material that is relatively hard and resistant to wear. For example, the cutting element substrate 22 may be formed from and include a ceramic-metal composite material (which is often referred to as a "cermet" material). The cutting element substrate 22 may include a cemented carbide material, such as a cemented tungsten carbide material, in which tungsten carbide particles are cemented together in a metallic binder material. The metallic binder material may include, for example, cobalt, nickel, iron, or alloys and mixtures thereof. In some instances, cutting element substrate 22 may comprise two pieces, the piece immediately supporting diamond table 24 and on which may be formed and bonded to another, longer piece of like diameter. In any case, the cutting elements 20 may be secured in pockets on blades 12 as depicted in FIG. 1, such as by brazing.

Figure 3:
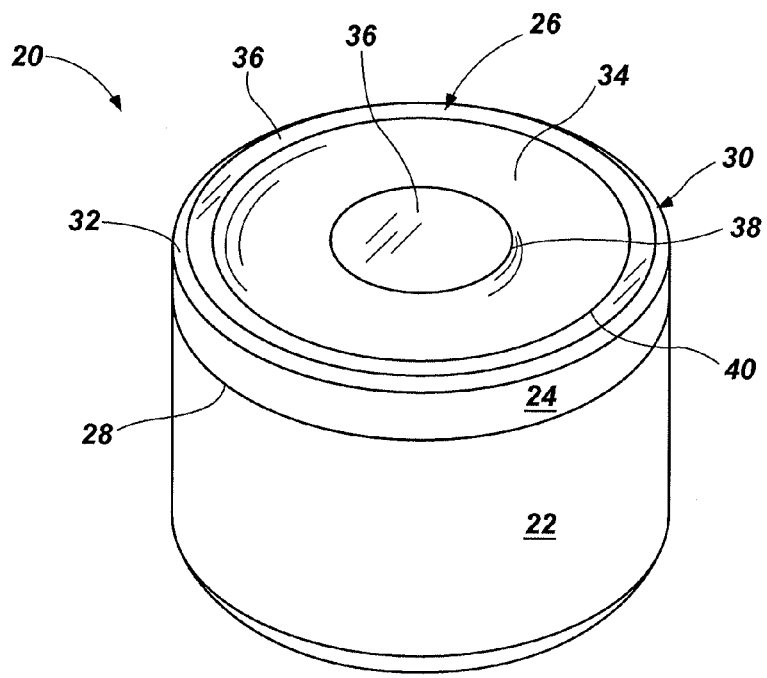
FIG. 3 is a perspective view of the cutting element of FIG. 2.

A circumferentially extending indentation 34 may be defined in the cutting face 26 of the cutting element 20. For example, a generally annular, arcuate indentation 34 may be defined in the cutting face 26 of the cutting element 20, as shown in FIGS. 2 and 3. The indentation 34 may be positioned proximate to an edge of the cutting element 20, such as proximate to the chamfer surface 32. The indentation 34 may be defined by an arcuate cross-section having a primary surface with a cross-sectional dimension defined by a radius R1. As a non-limiting example, the indentation may be an arcuate groove defined by a radius R1 of about 0.25 inch (about 6.35 mm) and having a depth D of about 0.012 inch (about 0.30 mm) relative to substantially planar surfaces 36 of the cutting face 26. The radially outer edge of the indentation 34 may be positioned a distance X of about 0.031 inch (about 0.79 mm) from the chamfer surface 32, and the chamfer edge 30 may have a width of about 0.010 inch (about 0.30 mm). The overall dimension of the cutting element 20 may be defined by a radius R2 of about 0.315 inch (about 8 mm). Additionally, a radially inward edge 38 and radially outward edge 40 of the indentation 34 (relative to a longitudinal axis 54 of the cutting element 20) may be radiused, or otherwise smoothed, to provide a relatively smooth transition between the indentation 34 and substantially planar surfaces 36 of the cutting face 26 of the cutting element 20.

In additional embodiments, the path that the indentation 34 extends along may be defined by other shapes, rather than a path configured as an annulus or a circle. For example, the indentation 34 may extend along a path shaped generally as a polygon, such as a generally triangular path, as shown in FIG. 4. For another example, the indentation 34 may extend along a path generally shaped as a regular n-sided polygon, where n may have any value from 3 to infinity, whereby n equal to infinity is equivalent to the aforementioned circular embodiment.

In additional embodiments, the path that the indentation 34 extends along may be generally shaped as a Reuleaux polygon (i.e., a curvilinear polygon built up of circular arcs), such as a path shaped generally as a Reuleaux triangle, as shown in FIG. 5. Additionally, the indentation 34 may be segmented, comprising a plurality of separate indentations that do not follow a single continuous path.

In yet additional embodiments, a transverse cross-sectional shape of the indentation 34 taken across a segment thereof may be defined by other shapes, in addition to a circular arc. For example, a cross-section of the indentation 34 may be generally defined as one or more of an elliptical arc (FIG. 6), a symmetric curved shape, an asymmetric curved shape, a symmetric V-shape (FIG. 7), and an asymmetric V-shape (FIG. 8).

The indentation 34 may be formed in the diamond table 24 after the diamond table 24 has been formed, such as by using electrical discharge machining (EDM), whereby a desired shape is achieved by using electrical discharges from an electrode (not shown). In some embodiments, the diamond table 24 may be moved relative an electrode having a shape of a desired cross-section of the indentation 34 (and/or the electrode may be moved along a desired path relative to the diamond table 24) to form the indentation 34. For example, an electrode having an arcuate shape may be lowered into the cutting face 26 of the diamond table 24, and then the diamond table 24 may be rotated to form an indentation 34 comprising an arcuate groove following an annular path. In additional embodiments, an electrode die having a negative shape of the desired indentation 34 (i.e., a protrusion), may be sunk into the cutting face 26 of the diamond table 24 to form the indentation 34.

Figure 9:
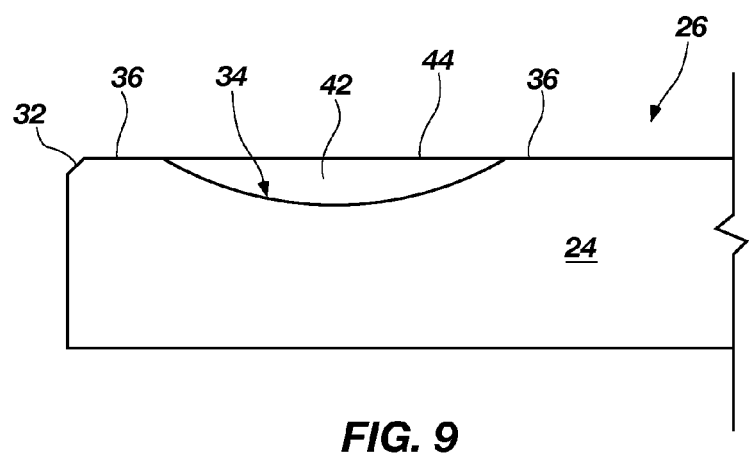
FIG. 9 is a cross-sectional view of a portion of a diamond table of a cutting element having an indentation substantially filled with a sacrificial structure, according to an embodiment of the present invention.
Figure 10:
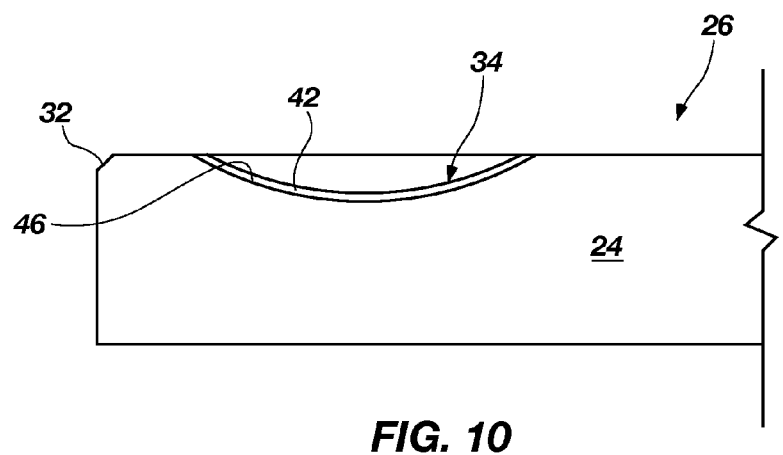
FIG. 10 is a cross-sectional view of a portion of a diamond table of a cutting element with a relatively thin sacrificial structure positioned over a surface of an indentation, according to an embodiment of the present invention.

In some embodiments, the indentation 34 in the diamond table 24 may include a sacrificial structure 42 positioned therein. For example, the sacrificial structure 42 may substantially fill the indentation 34 in the diamond table 24, such that a surface 44 of the sacrificial structure 42 may be substantially aligned and coplanar with the adjacent, substantially planar surfaces 36 of the cutting face 26 of the diamond table 24, as shown in FIG. 9. In another example, the sacrificial structure 42 may be a relatively thin material layer positioned over a surface 46 of the indentation 34, as shown in FIG. 10. In some embodiments, the sacrificial structure 42 may be comprised of a material that is softer than the diamond table 24, or that is otherwise more susceptible to wear than the diamond table 24, such as one or more of a ceramic, a cermet and a refractory metal. For example, the material of the sacrificial structure 42 may be one or more of tungsten carbide, aluminum oxide, tungsten, niobium, tantalum, hafnium, molybdenum, and carbides formed therefrom.

In such embodiments, the indentation 34 may be formed into the diamond table 24 during the formation of the diamond table 24. For example, the sacrificial structure 42 may be positioned within a mold (not shown) and powdered precursor material comprising diamond particles may be positioned over (e.g., around) the sacrificial structure 42. Then the powdered precursor material may be compacted and sintered in the presence of a catalyst mixed with the diamond particles or swept from an adjacent substrate as known in the art to form the diamond table 24, with the sacrificial structure 42 forming the indentation 34 in the diamond table 24. The entire sacrificial structure 42, or a portion thereof, may then be removed, such as by sandblasting, machining, acid leaching or another process, or the entire sacrificial structure 42, or a portion thereof, may remain positioned in the indentation 34 to be removed by the formation during drilling operations. Additionally, for embodiments wherein the entire sacrificial structure 42, or a portion thereof, may then be removed, such as by sandblasting, machining, acid leaching or another process, the diamond table 24 may be machined, such as by an EDM process, to a final geometry.

In some embodiments, the sacrificial structure 42 may be positioned within the indentation 34 in the diamond table after the indentation 34 is formed therein, such as after a high-pressure/high-temperature (HPHT) process. For example, a sacrificial structure 42 may comprise one or more of a polymer, a glass, a ceramic, a cement, a refractory metal, and a combination thereof that may be positioned within the indentation 34 of the diamond table 24. In view of this, the cutting face 26 of the cutting element 20 may appear substantially planar in an unused state, with the sacrificial structure 42 positioned therein. Upon wearing, the sacrificial structure 42 may wear away and the indentation 34 may become exposed for engagement with a formation during drilling operations.

In further embodiments, a powder perform, such as a diamond comprising powder contained in a cylindrical niobium cup, may be positioned adjacent a shaped mold, such as a mold having a shaped protrusion, during at least a portion of the sintering process. For example, the powder perform may be positioned adjacent the shaped mold (not shown) during a high-pressure/high-temperature (HPHT) process and a shape imparted by the shaped mold may be retained throughout a sintering cycle to form the indentation 34 in the diamond table 24. In further embodiments, the shape imparted by the mold may be near a desired net shape of the indentation 34, and the final shape of the indentation 34 may be machined, such as by an EDM process, to a final geometry.

Optionally, the catalyst material may be removed from the hard polycrystalline material of the diamond table 24 after the HPHT process, as known in the art. For example, a leaching process may be used to remove catalyst material from interstitial spaces between the inter-bonded grains of the hard polycrystalline material of the diamond table 24. By way of example and not limitation, the hard polycrystalline material may be leached using a leaching agent and process such as those described more fully in, for example, U.S. Pat. No. 5,127,923 to Bunting et al., (issued Jul. 7, 1992), and U.S. Pat. No. 4,224,380 to Bovenkerk et al., (issued Sep. 23, 1980), the disclosure of each of which patent is incorporated herein in its entirety by this reference. Specifically, aqua regia (a mixture of concentrated nitric acid ($HNO_3$) and concentrated hydrochloric acid (HCl)) may be used to at least substantially remove catalyst material from the interstitial spaces between the inter-bonded grains in the hard polycrystalline material of the diamond table 24. It is also known to use boiling hydrochloric acid (HCl) and boiling hydrofluoric acid (HF) as leaching agents. One particularly suitable leaching agent is hydrochloric acid (HCl) at a temperature of above 110° C., which may be provided in contact with the hard polycrystalline material of the diamond table 24 for a period of about two hours to about 60 hours, depending upon the size of the body comprising the hard polycrystalline material. After leaching the hard polycrystalline material, the interstitial spaces between the inter-bonded grains within the hard polycrystalline material may be at least substantially free of catalyst material used to catalyze formation of inter-granular bonds between the grains in the hard polycrystalline material. In some embodiments, leaching may be selectively applied to specific regions of the diamond table 24, and not to other regions. For example, in some embodiments, a mask may be applied to a region of the diamond table 24, such as the indentation 34 or a region of the indentation 34 in the diamond table 24, and only the unmasked regions may be leached.

Additionally, an outer surface of the diamond table 24 may be physically modified, such as by polishing to a smooth or mirrored finish. For example, an outer surface of the diamond table 24 may have a reduced surface roughness, such as described in U.S. Pat. No. 6,145,608, which issued on Nov. 14, 2000 to Lund et al., and is assigned to the assignee of the present application; U.S. Pat. No. 5,653,300, which issued Aug. 5, 1997 to Lund et al., and is assigned to the assignee of the present application; and U.S. Pat. No. 5,447,208, which issued Sep. 5, 1995 to Lund et al., and is assigned to the assignee of the present application, the disclosure of each of which is incorporated herein in its entirety by this reference.

In conventional PDC cutting elements, a cutting face or leading face of PDC might be lapped to a surface finish of 20 μin. (about 0.508 μm) to 40 μin. (about 1.02 μm) root mean square RMS (all surface finishes referenced herein being RMS), which is relatively smooth to the touch and visually planar (if the cutting face is itself flat), but which includes a number of surface anomalies and exhibits a degree of roughness which is readily visible to one even under very low power magnification, such as a 10× jeweler's loupe. However, an exterior surface of the diamond table 24 may be treated to have a greatly reduced surface roughness. As a non-limiting example, an exterior surface of the diamond table 24 may be polished a surface roughness of about 0.5 μin. (about 0.0127 μm) RMS.

In some embodiments, the surface roughness of a surface of the diamond table 24 may be reduced by lapping of the cutting face 26 on conventional cast iron laps known in the art by using progressively smaller diamond grit suspended in a glycol, glycerine or other suitable carrier liquid. The lapping may be conducted as a three-step process commencing with a 70 micron grit, progressing to a 40 micron grit and then to a grit of about 1 to 3 microns in size. In contrast, standard lapping techniques for a PDC cutting element, which may follow an initial electrodischarge grinding of the cutting face, finish lapping in one step with 70 micron grit. By way of comparison of grit size, 70 micron grit is of the consistency of fine sand or crystalline material, while 1 to 3 micron grit is similar in consistency to powdered sugar.

In additional embodiments, the surface roughness of a surface of the diamond table 24 may be reduced by placing the surface in contact with a dry, rotating diamond wheel. For example, the Winter RB778 resin bonded diamond wheel, offered by Ernst Winter & Sons, Inc. of Travelers Rest, S.C., may be utilized. It may be important that the wheel be cooled as the diamond wheel is of resin bonded construction. Elevated temperatures may result in the destruction of the wheel. The nature of the polishing process may require that the abrasive surface be kept dry. However, the wheel may be moistened with water at the start of the polishing process to reduce drag and facilitate proper orientation of the diamond table 24 against the wheel. In addition, a temperature range wherein polishing may be effected may be between about 140° F. (about 60° C.) and about 220° F. (about 104° C.). While specific polishers employed may rotate at about 3500 RPM, it is believed that a range between about 3000 RPM and about 5000 RPM would likely be adequate. About 2 lb. force (about 0.9 Kg) to about 8 lb. force (about 3.6 Kg) may be applied to the diamond table 24 against the wheel. As noted, the finish of an exterior surface of the diamond table 24 may be smoothed to about 0.5 μin. (about 0.0127 μm) RMS or less surface finish roughness approaching a true "mirror" finish. It may take about fifty minutes to about an hour of polishing with the aforementioned diamond wheel to achieve this finish on a surface of a one-half inch (about 1.27 cm) diameter diamond table 24, and about one and one-half to about two hours for a nominal three-quarter inch (about 1.905 cm) diameter diamond table 24. This same method described for polishing a face of the diamond table 24 may also be applied to polish the chamfer 32, as well as the side of the diamond table 24. To polish such surfaces, the diamond table 24, held by the substrate 22, is disposed at the desired angle to the rotating wheel. The cutting element 20 may then be rotated about an axis of symmetry to smooth and polish the chamfer 32 or other side areas of the diamond table 24. Thus, one could smooth and polish a curved, ridged, waved or other cutting face of a diamond table 24 to remove and reduce both large and small asperities, resulting in a mirror finish cutting face, which nonetheless is not flat in the absolute sense.

The cutting element cutting surfaces (cutting face, chamfer, side, etc.) may be polished by other methods, such as ion beams or chemicals, although the inherently inert chemical nature of diamond may make the latter approach somewhat difficult for diamond.

While an industry-standard PDC or other superhard cutting element may have a lapped surface finish on the cutting face with irregularities or roughness (measured vertically from the surface) on the order of 20 μin. (about 0.508 μm) to 40 μin. (about 1.02 μm) RMS, as a result of the above-described polishing, some embodiments may have a diamond table 24 surface roughness between about 0.3 μin. RMS and about 0.5 μin. (about 0.0127 μm) RMS. Additional embodiments may have a diamond table 24 surface roughness between about 0.4 μin. (about 0.0102 μm) RMS and about 0.6 μin. (about 0.0152 μm) RMS. In yet additional embodiments, the diamond table 24 may have a surface roughness less than about 10 μin. (about 0.254 μm) RMS. In further embodiments, the diamond table 24 may have a surface roughness less than about 2 μin. (about 0.0508 μm) RMS. In yet further embodiments, the diamond table 24 may have a surface roughness less than about 0.5 μin. (about 0.0127 μm) RMS, approaching a true "mirror" finish. The foregoing surface roughness measurements of the diamond table 24 may be measured using a calibrated HOMMEL® America Model T-4000 diamond stylus profilometer contacting the surface of the diamond table 24.

In view of the foregoing, selected surfaces of the diamond table 24 may be polished or otherwise smoothed to have a reduced surface roughness. In some embodiments, the substantially planar surfaces 36 of the cutting face 26 may have a reduced surface roughness. In further embodiments, the surface of the indentation 34 may have a reduced surface roughness. In yet further embodiments, the entire cutting face 26 of the diamond table 24 may have a reduced surface roughness. In additional embodiments, the chamfer 32 and/or other side surfaces of the diamond table 24 may have a reduced surface roughness. In yet additional embodiments, all of the exposed surfaces of the diamond table 24 may have a reduced surface roughness.

Figure 11:
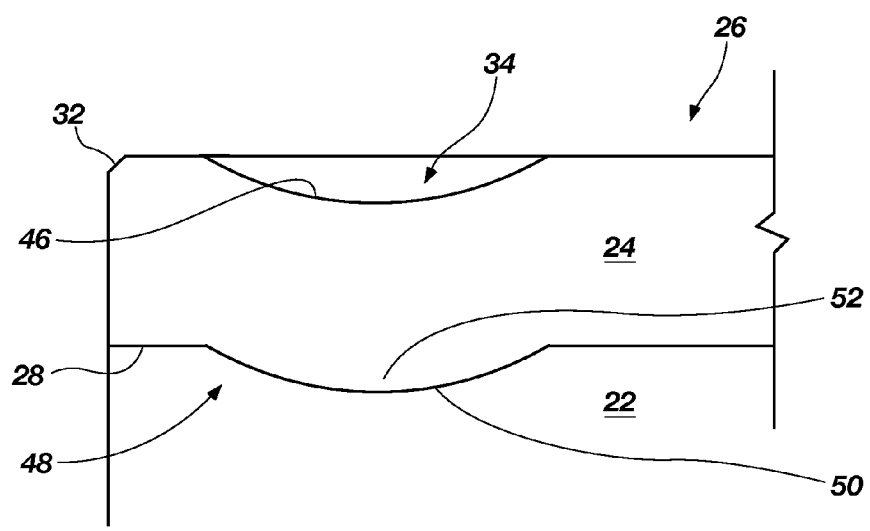
FIG. 11 is a cross-sectional view of a portion of a cutting element with a shaped region at an interface between a diamond table and a substrate corresponding to a shape of an indentation in a cutting face of the diamond table, according to an embodiment of the present invention.
Figure 12:
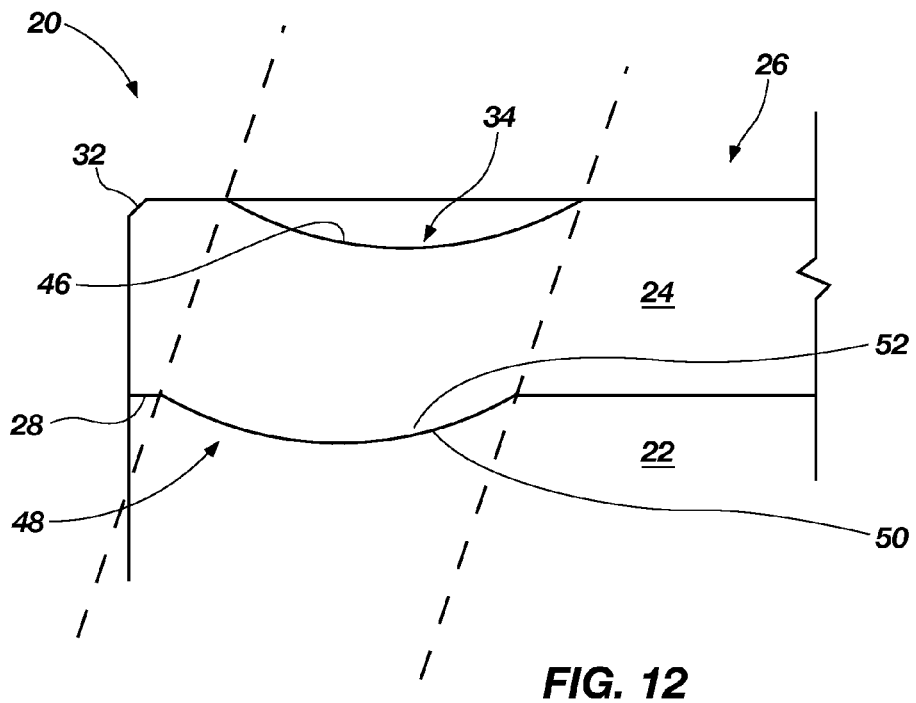
FIG. 12 is a cross-sectional view of a portion of a cutting element with a shaped region at an interface between a diamond table and a substrate corresponding to a shape of an indentation in a cutting face of the diamond table positioned radially outward of the indentation, according to an embodiment of the present invention.
Figure 13:
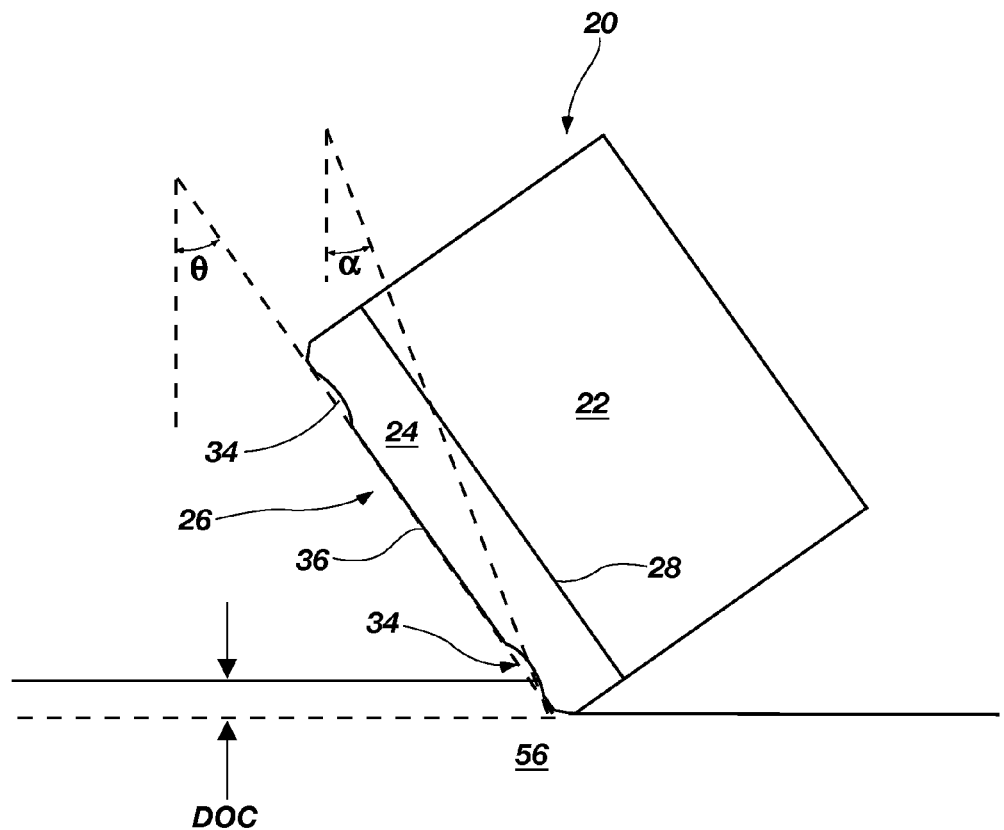
FIG. 13 is a schematic view of a cutting element having an indentation in a cutting face of a diamond table interacting with a formation during drilling operations, according to an embodiment of the present invention.

Referring now to FIG. 13, drilling forces caused by interaction between a formation 56 and the indentation 34 may exacerbate or amplify stress concentrations within the diamond table 24 above that of an otherwise similar PDC cutter without an indentation feature. In view of this, a shape of the interface 28 between the diamond table 24 and the substrate 22 of the cutting element 20 may be configured to effectively distribute stresses caused by cutting forces in and around the indentation 34 in the diamond table 24, to improve the structural integrity of the cutting element 20. For example, a shaped region 48 corresponding to a shape of the indentation 34 in the cutting face 26 of diamond table 24 may define a region of the interface 28, such as shown in FIG. 11. In some embodiments, the shaped region 48 of the interface 28 may be defined by an indentation 50 in the substrate 22 and a protrusion 52 (FIGS. 11 and 12) of the diamond table 24 at the interface 28. In view of this, the shaped region 48 of the interface 28 may provide a generally uniform thickness of the diamond table 24. In some embodiments, the shaped region 48 of the interface 28 corresponding to the indentation 34 in the diamond table 24 may be positioned directly, longitudinally, below the indentation 34 in the diamond table 24. In further embodiments, at least a portion of the shaped region 48 of the interface 28 corresponding to the indentation 34 in the diamond table 24 may underlie the indentation 34 at a position radially inward of the indentation 34 relative to a longitudinal axis 54 (FIG. 2) of the cutting element 20. In additional embodiments, at least a portion of the shaped region 48 of the interface 28 corresponding to the indentation 34 in the diamond table 24 may underlie the indentation 34 at a position radially outward of the indentation 34 relative to a longitudinal axis 54 (FIG. 2) of the cutting element 20, as shown in FIG. 12. Such a configuration may account for a projected direction of travel of the cutting element 20 relative to a formation (as indicated by the dashed lines in FIG. 12), as this may correspond to a primary general direction of cutting forces applied to the cutting element 20 during drilling operations. In other words, the shaped region of the interface 28 may be sized, shaped and positioned to reduce stress concentrations, and/or to provide sufficient structural strength to withstand anticipated stress concentrations, that may result from drilling operations. Furthermore, the diamond layering composition of the diamond table 24 may be tailored in the shaped region to compensate for residual stresses and provide a tailored material property of the diamond table 24, such as a tailored strength and toughness, in the shaped region.

In top-hole drilling operations, such as first bit under surface (FBUS) drilling operations, the geometry of the cutting element 20 may provide improved aggressiveness for a given depth-of-cut (DOC). When drilling in relatively soft formations at high depths of cut, such as formations typically experienced during an FBUS drilling operation, increases in aggressivity can be achieved with the cutting elements 20 described herein, while maintaining standard back-rakes, which can increase durability and longevity of the cutting elements 20. As a non-limiting example, a DOC up to about 0.15 inch (about 3.8 mm) may be targeted in a drilling operation such as shown in FIG. 13. The region of the formation 56 that contacts the indentation 34 in the cutting face 26 of the diamond table 24 of the cutting element 20 may contact the cutting element 20 at an angle α different than an angle θ of the substantially planar surfaces 36 of the cutting face 26. In view of this, the effective rake angle α of the cutting element 20 may be less than the backrake angle θ of the cutting element 20, thus resulting in increased aggressivity. Furthermore, a single bit body 11 design may be combined with different cutting element 20 designs to provide fixed-cutter rotary drill bits 10 having the same bit body 11 design, yet having various effective rake angles α. For example, a first earth-boring drill bit having a first bit body may include cutting elements having a substantially planar cutting element face with no indentation formed therein and have a first effective rake angle θ. A second earth-boring drill bit having a second bit body, having the same design as the first bit body, may include cutting elements having indentations in the face of the cutting element, as described herein, and may have a second effective rake angle α, different than the first effective rake angle of the first bit. In view of this, by varying the geometry and position of the indentation the effective rake angle α and aggressiveness of a cutting element 20 may be varied, without a change in bit body 11 design.

In some embodiments, a depth-of-cut limiting feature on an earth-boring tool may be positioned to facilitate interaction between an uncut earth formation and an indentation 34 in the cutting face 26 of the diamond table 24 during earth-boring operations. For example, the depth-of-cut limiting feature on an earth-boring tool may be one or more of an outer surface of a blade 12 of the drill bit 10 shown in FIG. 1 and a bearing block feature as described in U.S. patent application Ser. No. 12/766,988, filed Apr. 26, 2010, for "BEARING BLOCKS FOR DRILL BITS, DRILL BIT ASSEMBLIES INCLUDING BEARING BLOCKS AND RELATED METHODS," the disclosure of which is incorporated herein in its entirety by this reference. For example, the depth-of-cut limiting feature may be positioned to be aligned with the deepest portion of the indentation 34 in the cutting face 26 of the diamond table 24. As the cutting element 20 may have a generally cylindrical shape and the indentation 34 may have a generally annular shape, it may be the deepest portion of the indentation 34 that extends the furthest from the body of the earth-boring tool (i.e., the portion that extends furthest from the blade 12 of the drill bit 10) that is aligned with the depth-of-cut limiting feature. In view of this, the uncut formation may contact the cutting face 26 of the diamond table 24 well into the indentation 34 during drilling operations, such that the curved or angled surface of the indentation 34 positioned radially outward (relative to a primary axis of the cutting element 20) of the deepest portion of the indentation 34 may interact with the uncut formation 56 and provide a desired effective rake angle α.

Although the foregoing description contains many specifics, these are not to be construed as limiting the scope of the present invention, but merely as providing certain exemplary embodiments. Similarly, other embodiments of the invention may be devised that are within the scope of the present invention. For example, features described herein with reference to one embodiment may also be combined with features of other embodiments described herein. The scope of the invention is, therefore, indicated and limited only by the appended claims and their legal equivalents, rather than by the foregoing description. All additions, deletions, and modifications to the invention, as disclosed herein, which fall within the meaning and scope of the claims, are encompassed by the present invention.

What is claimed is:

1. A cutting element for an earth-boring tool, comprising:
a substrate; and
a diamond table positioned on the substrate, the diamond table having a cutting face opposite an interface between the diamond table and the substrate, the diamond table including an indentation in the cutting face, the substrate having a shaped feature at the interface between the diamond table and the substrate, the shaped feature corresponding to the indentation in the cutting face of the diamond table, the shaped feature comprising an indentation in the substrate having a shape similar to the shape of the indentation in the cutting face of the diamond table, wherein at least a portion of the indentation in the substrate is positioned at least one of radially outward and radially inward of the indentation in the cutting face of the diamond table relative to a longitudinal axis of the cutting element.

2. The cutting element of claim 1, wherein the indentation in the substrate is located and configured to reduce stress concentrations within the diamond table during an earth-boring operation.

3. The cutting element of claim 1, wherein the indentation in the substrate is sized, shaped and positioned to provide the diamond table with a thickness, taken along a line corresponding to a projected predetermined direction of travel of the cutting element relative to uncut formation material and intersecting the cutting face at any location within the indentation in the cutting face, greater than a thickness along the line in a similar cutting element lacking the indentation in the substrate.

4. The cutting element of claim 1, wherein the indentation in the cutting face of the diamond table is configured to cause uncut formation material to contact the cutting face within the indentation at a rake angle different than the rake angle of the cutting face outside the indentation.

5. The cutting element of claim 1, wherein the indentation in the cutting face of the diamond table extends along a path generally shaped as one of a circle, a polygon, and a Reuleaux polygon.

6. The cutting element of claim 1, wherein a cross-section of the indentation in the cutting face of the diamond table is generally shaped as one of a circular arc, an elliptical arc, a symmetric V-shape, and an asymmetric V-shape.

7. The cutting element of claim 1, wherein the diamond table comprises a surface having a surface roughness less than about 10 μin. RMS.

8. The cutting element of claim 7, wherein the surface of the diamond table having a surface roughness less than about 10 μin. RMS is located in the indentation in the cutting face.

9. The cutting element of claim 8, wherein the entire surface of the indentation in the cutting face of the diamond table has a surface roughness less than about 10 μin. RMS.

10. The cutting element of claim 7, wherein the surface of the diamond table having a surface roughness less than about 10 μin. RMS is located on the cutting face outside of the indentation.

11. The cutting element of claim 10, wherein an entire planar surface of the cutting face outside the indentation in the cutting face has a surface roughness less than about 10 μin. RMS.

12. The cutting element of claim 7, wherein the surface of the diamond table having a surface roughness less than about 10 μin. RMS is located on the cutting face inside and outside of the indentation.

13. The cutting element of claim 12, wherein the entire cutting face has a surface roughness less than about 10 μin. RMS.

14. An earth-boring tool, comprising:
at least one cutting element comprising:
a diamond table positioned on a substrate;
an indentation in a cutting face of the diamond table;
a shaped feature in the substrate at an interface between the diamond table and the substrate corresponding to the indentation in the cutting face of the diamond table; and
a depth-of-cut limiting feature positioned on the earth-boring tool to facilitate interaction between uncut earth formation and the indentation in the cutting face of the diamond table during earth-boring operations.

15. The earth-boring tool of claim 14, wherein the depth-of-cut limiting feature is aligned with a deepest portion of the indentation in the cutting face.

16. The earth-boring tool of claim 14, wherein a cross-section of the indentation in the cutting face of the diamond table has an arcuate shape, and the at least one cutting element is configured to interact with uncut earth formation at different rake angles responsive to a depth-of-cut of the cutting element determined by the depth-of-cut limiting feature.

17. A method of forming a cutting element, the method comprising:
positioning a sacrificial structure in a mold;
positioning a powdered precursor material over the sacrificial structure; and
pressing and sintering the powdered precursor material to form a diamond table having an indentation in a cutting face formed by the sacrificial structure.

* * * * *